Aug. 26, 1969    E. B. TERILLI    3,462,870
AERIAL FISHING SYSTEM
Filed Oct. 26, 1966    3 Sheets-Sheet 1
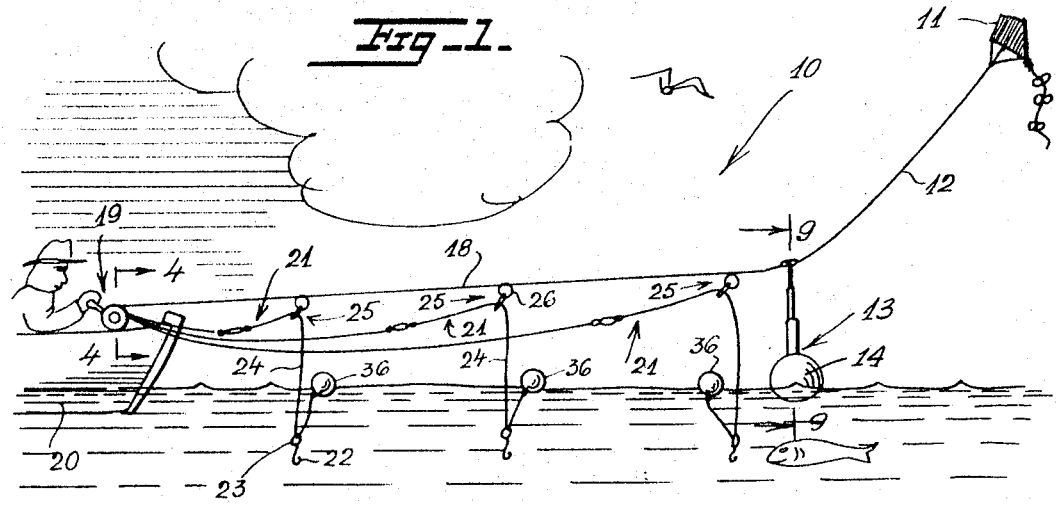
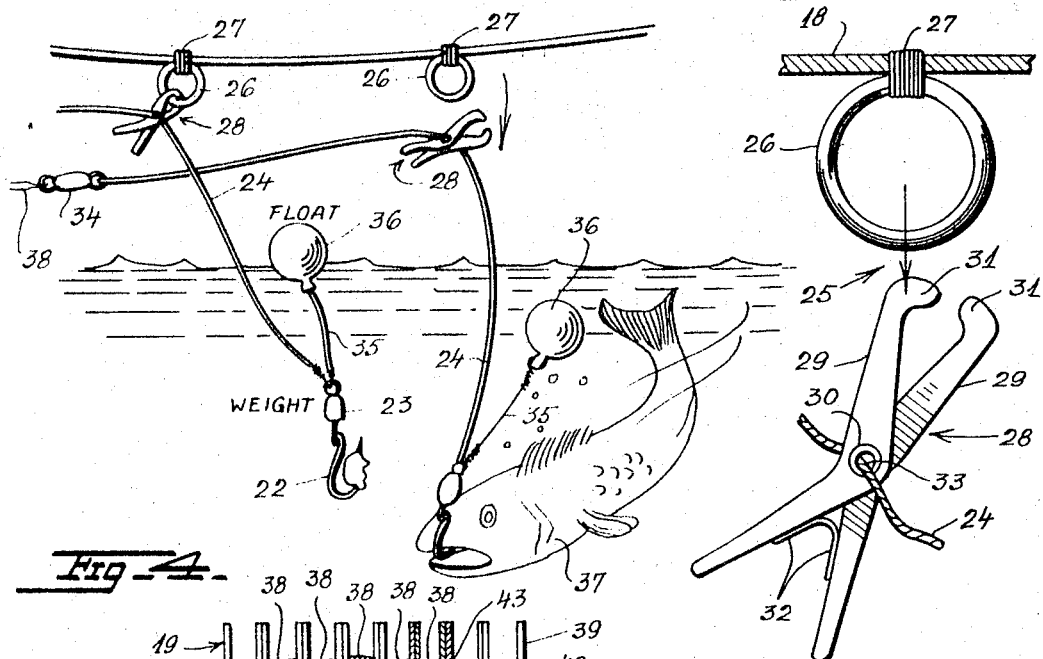
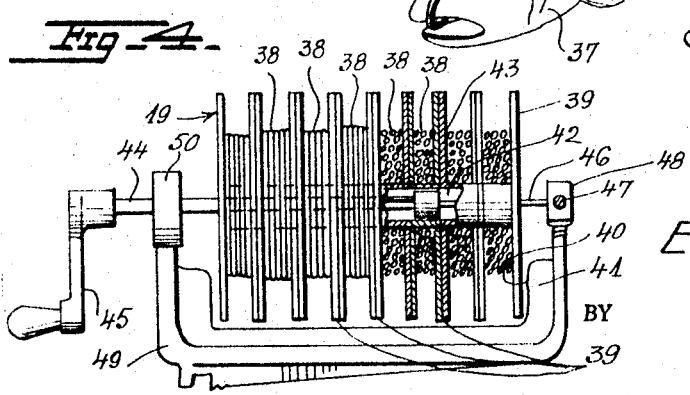
INVENTOR
Emil B. Terilli
BY Polachek & Saulsbury
ATTORNEYS

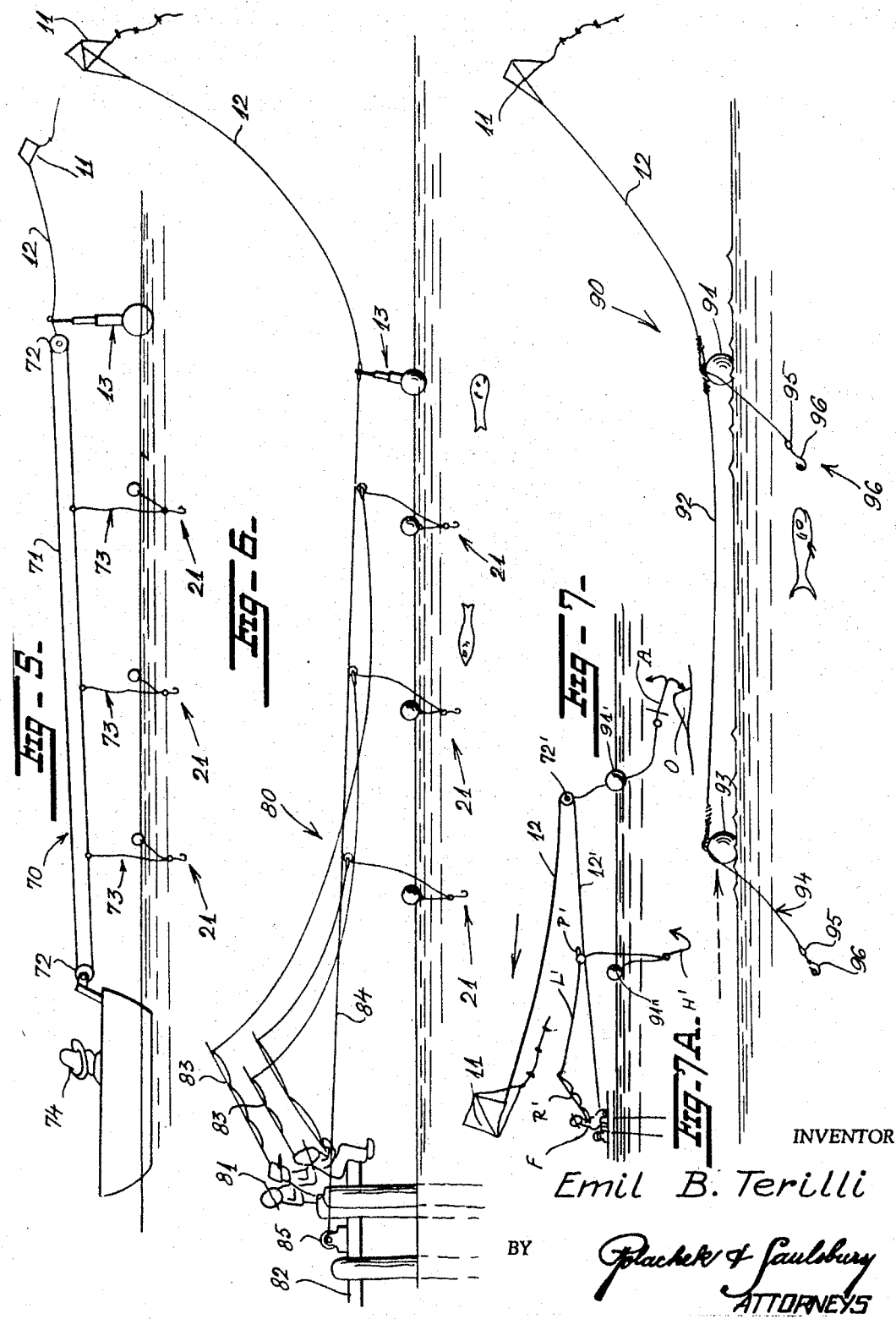

Aug. 26, 1969     E. B. TERILLI     3,462,870
AERIAL FISHING SYSTEM
Filed Oct. 26, 1966     3 Sheets-Sheet 3
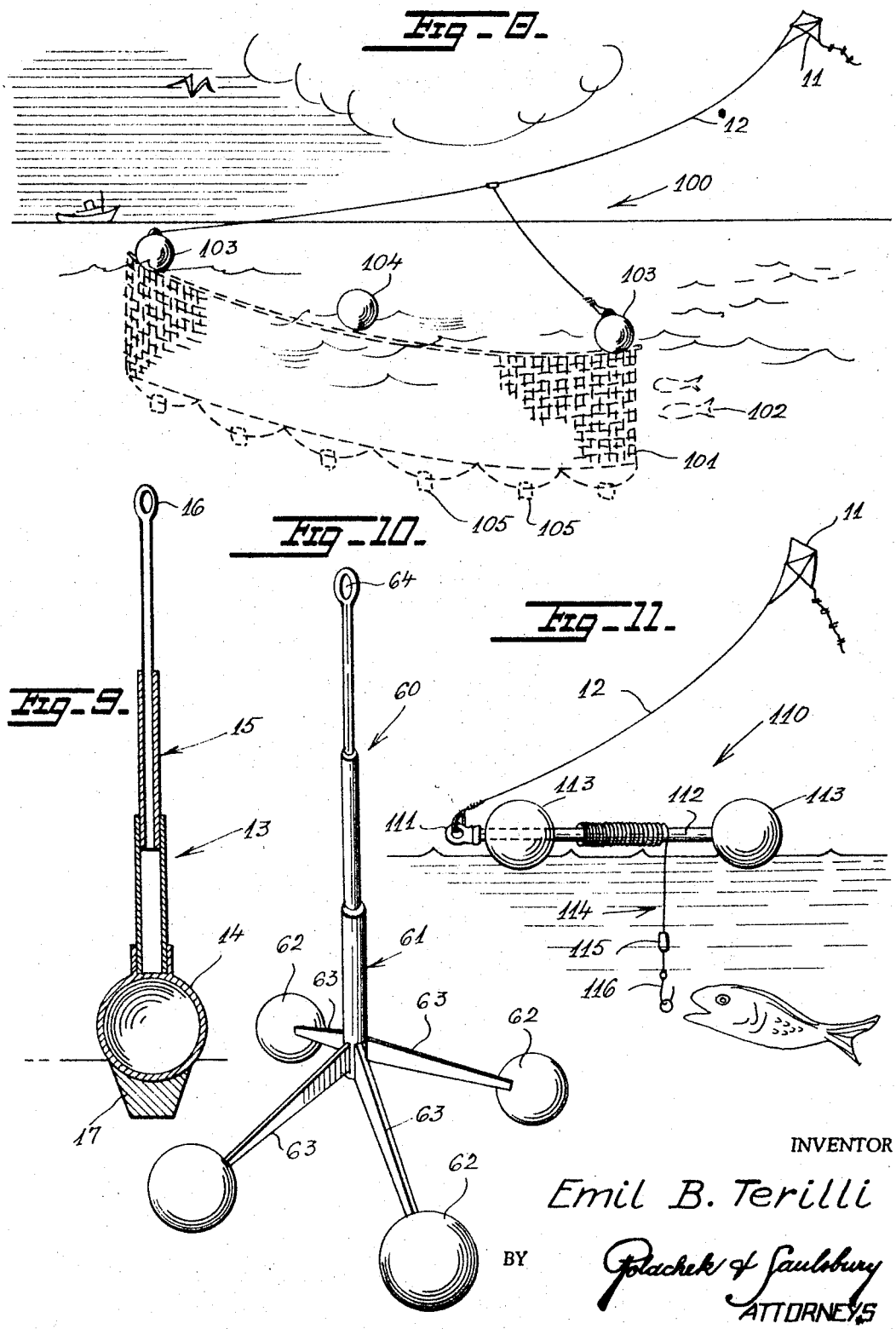
INVENTOR
*Emil B. Terilli*
BY *Polachek & Saulsbury*
ATTORNEYS

United States Patent Office 3,462,870
Patented Aug. 26, 1969

3,462,870
AERIAL FISHING SYSTEM
Emil B. Terilli, 3750 Hudson Manor Terrace,
Riverdale, N.Y. 10463
Filed Oct. 26, 1966, Ser. No. 589,676
Int. Cl. A01k 69/00, 79/00, 73/04
U.S. Cl. 43—4                                6 Claims

ABSTRACT OF THE DISCLOSURE

Kite fishing apparatus for use with a boat having a reel assembly. A buoy line is attached to the reel assembly and independent fishing lines are releasably attached to the buoy line. A buoy is connected to the buoy line and a kite line with a kite is attached to the buoy. Means is provided for releasing the fishing lines from the buoy line.

---

This invention relates generally to fishing systems. More specifically it relates to systems for fishing which are particularly adapted for sportsmen.

A principal object of the present invention is to provide a novel fishing system for sportsmen, which is designed to incorporate a relatively large number of individual fishing lines and hooks, thereby increasing the sportsman's opportunity to catch a large number of fish.

Another object of the present invention is to provide a novel fishing system which permits placement of the baited fishing hooks in a region relatively far from the location of the fisherman, the hooks thus being operative within a region which is far from noise and movements of people which normally frighten fish away.

Yet another object of the present invention is to provide a novel fishing system which is maintained within a particular fishing area by means of an airborne kite.

Yet another object of the present invention is to provide a novel kite fishing system wherein a kite is tethered to a floating buoy that is towed outward across the surface of the water by the kite, and to which a buoy covering line is secured that supports a plurality of individual fishing lines.

Yet another object of the present invention is to provide a kite fishing system which is adaptable for being operated from a boat upon the water, a pier or the shore, and wherein the system may be operated by an individual fisherman or wherein the system maybe used to handle the individual fishing lines of a large number of fishermen.

Another object of the invention is to provide a fishing system wherein after the fish has taken bait or is caught, the float itself permits the fish to take off with the float and be released from the kite line, the float acting both as a drag and a marker.

Still a further object is to provide a kite fishing system wherein each individual fishing line includes a novel release system so to free the fishing line from the remainder of the system when a fish strikes, thereby allowing the fisherman to pull in the line without disturbing the remain fishing lines.

Other objects are to provide a kite fishing system which is simple in design, inexpensive to manufacture, rugged in construction, easy to use and efficient in operation.

These and other objects will be readily evident upon a study of the following specification and the accompanying drawings wherein:

FIGURE 1 is a side elevation view showing one form of the present kite fishing system operated by an individual fisherman from a boat, FIG. 2 is an enlarged detail view thereof and showing the release mechanism in operative use, FIG. 3 is a side elevation view of the release mechanism;

FIG. 4 is an enlarged cross-sectional view taken on the line 4—4 of FIG. 1,

FIG. 5 is a side elevation view of a modified form of the present kite fishing system which employs an endless line supported between pulleys, FIG. 6 is a side elevation view of yet another modified form of the present invention shown in operative use from a pier by a group of fishermen, FIG. 7 is a still further form of the invention in which the kite has been blown from the sea toward the fisherman and the line pulley anchored, FIG. 7A is a side elevation view of another modified form of the invention wherein the system is used for trolling, FIG. 8 is a perspective view showing the kite fishing system in use to tow a fishing net, FIG. 9 is an enlarged cross-sectional view taken on the line 9—9 of FIG. 1, FIG. 10 is a perspective view of a modified form of buoy, and FIG. 11 is a side elevation view showing a modified form of fishing line support by the kite fishing system.

Referring now to the drawings in detail, and more particularly to FIGS. 1 to 4 and FIG. 9, the reference numeral 10 represents a kite fishing system according to the present invention wherein there is a kite 11 that is tethered by a kite line 12 to a buoy 13. The kite is of conventional form insuring perfect buoyancy, with intersecting sticks, requiring a minimum of wind velocity. Once in the air it stays in the air for high or low altitude as desired. The buoy 13 is comprised of a hollow float 14 and which supports a mast 15 vertically upward therefrom, the mast having an eye hook 16 at its upper end to which the kite line 12 is secured. A weight 17 is secured to the lower side of the float 14 so that the buoy floats with the mast in an upstanding direction at all times. The mast 15 may be made in a plurality of sections which telescope into each other, a shown in FIG. 9.

One end of buoy line 18 is also secured to the eye hook 16 of the buoy, the opposite end of the buoy line being wound upon a reel 19 carried within a boat 20. A plurality of fishing lines 21 are supported approximately equidistant apart along the buoy line 18, each of the fishing lines 21 including a fishing hook 22 and a sinker 23 at one end of a line 24 that is passed through a release mechanism 25 secured upon the buoy line 18.

The release mechanism 25 includes a ring 26 permanently affixed to the buoy line 18 by means of a winding of thread 27 or by other equipment means, and a clip 28 that is releasably secured to the ring 26. The clip 28 is comprised of a pair of arms 29 that are pivotably secured together at their midportions by a grommet 30, one end of each of said arms being configurated to form a hook 31 that is adaptable for being snapped over the ring 26 and the other ends of the arms being activated by a spring 32 that normally urges the hooks 31 into a clamping position. An opening 33 in the grommet 30 permits the line 24 to extend therethrough, the opposite end of the line 24 being connected to a barrel swivel 34. A separate line 35 is connected at one end to the weight 23 and at its opposite end to a float 36 which may be brightly colored so that the fisherman may readily see any movement thereof in case a fish 37 strikes the particular fishing line. The barrel swivel 34 is connected to a line 38, the end of which is wound upon the reel 19.

For practical purposes and for efficient handling of a plurality of fishing lines, the reel 19 is constructed as shown in FIG. 4 of the drawing, wherein the assembly is comprised of a plurality of spools 39 each of which may be individually wound without disturbing the others. In the present construction the spools 39 are retained adjacent each other and in alignment by being supported within a trough 40 of a cradle 41. Each spool 39 includes a central opening 42 extending therethrough which is of square configuration and which is engageable by a correspondingly square portion 43 at the end of a hollow sleeve 44 having a crank handle 45 at its opposite end. The sleeve 44 is longitudinally slidable upon a shaft 46 that extends into the sleeve 44 and which is secured by means of a set screw 47 at one end in a bearing 48 of a bracket 49, the opposite portion of the sleeve 44 being supported within a bearing 50 on the bracket 49. The bracket 49 may be secured by any well known means to the boat 20.

In operative use, the kite 11 is allowed to fly out the required distance and when airborne is then secured to the buoy 13, after which the buoy line 18 is secured to the buoy and the buoy is allowed to be towed upwardly upon the water surface by the kite. The individual fishing lines 21 are each baited and connected to the release mechanisms 25 so that in normal fishing operation the system is as shown in FIG. 1. When a fish 37 strikes and is caught upon the fishing hook, he attempts to break away by swinging away rapidly, thereby causing the float 36 to move about rapidly upon the water surface or disappear below thereby attracting the attention of the fisherman. At the same time the violent movement of the fish will apply force upon the line 24 causing it to release the clip 28 from the ring 26, thus allowing the particular fishing line to be cleared of the remaining fishing lines upon the kite fishing system. The fisherman may now slide the sleeve 44 so that the square portion 43 thereof is in engagement with the particular spool 39, thus allowing him to reel in the particular fishing line that has been struck by the fish.

In a modified construction shown in FIG. 10, the buoy 60 is shown to include a mast 61 that is comprised of telescopic sections and which is supported upon a plurality of floats 62 that are positioned at the ends of radially outwardly extending arms 63 thereby providing a construction wherein the buoy will remain upright without the necessity of employing weights. The further the floats are spread apart, the greater the ability of the buoy to remain in a vertical position with the eye hook 64 being at all times above the water. The telescopic sections of the buoys permit maintenance of the buoy line 18 to remain out of the water regardless of the size of the waves and thereby permit control of the length of the vertically downward portion of the lines 24. In another instance the float is anchored so fishing is permitted when the wind is blowing in any direction. The float may be made of high flotation material such as cork or sponge plastics.

In FIG. 5 a modified kite fishing system 70 is shown which includes all of the above described elements but wherein the buoy line 71 is of endless character and is wound upon pulleys 72, one of which is secured to the buoy and the other of which is secured to the boat. The figure illustrates a plurality of fishing lines 73 which are secured along the length of the buoy line 71 and which do not include the release mechanism 25. In the present construction when a fish strikes one of the fishing lines, the fisherman 74 simply pulls in the buoy line until the particular fishing line that has been struck is reached and the fisherman can retrieve the caught fish.

In FIG. 6 a further modified construction is shown which is generally similar to the structure shown in FIG. 1, but wherein the system is operated by a plurality of fishermen 81 who are fishing from a pier 82. Accordingly the reel 19 shown in FIG. 1 is replaced by a plurality of individual fishing rods 83 and only the buoy line 84 is secured to a separate reel 85.

In FIG. 7A a further modified construction 90 is shown wherein the kite 11 is connected by a kite line 12 to a float 91 and then by connecting lines 92 to one or more other floats 93. A plurality of fishing lines 94 including weights 95 and baited hooks 96 are secured to the various floats and possibly even to the connecting lines 92. In the present construction the entire system is untethered to any boat or shore and thus the system is free to be towed through the water by means of the kite, thereby permitting use of the device for trolling. The float serves as a drag and eventual marker. After a catch the float and fish can be released.

In FIG. 7 there is shown a kite 11 which has been blown from the sea toward the fisherman F. In order to maintain the line 12 extended toward the sea, a pully 72' is connected to a float 91' that has an anchor A that is held by an obstruction O on the sea floor. The fisherman F has a rod and reel R' to which a line L' is connected from a pulley P' operable along underside 12' of kite line 12 and has a float 91" for supporting a hook H'. The anchor A will have been carried out to sea by the fisherman when the prevailing direction of the wind has been such as to take the kite to the rear of him.

In FIG. 8 a modification 100 is shown which is generally similar to the structure shown in FIG. 7A but wherein the kite is employed to tow a fishing net 101 through the water so as to drive fish 102 into a particular area where they may be caught. In the present construction the kite line 12 is secured to floats 103 at the opposite ends of the net, the net being held in a vertical position by means of additional floats 104 along the upper edge thereof and a plurality of weights 105 along the lower edge thereof.

In FIG. 11 a further modified construction 110 is shown wherein the kite line 12 is secured to a swivel 111 at one end of a rotatable shaft or reel 112 that is supported at its opposite ends in floats 113. A fishing line 114 having a weight 115 and baited fishing hook 116 at one end thereof is wound up at its opposite end upon the shaft 112, the fishing line being unwound when a fish strikes and pulls upon the line, thereby causing the unwinding of the line to rotate the shaft and the floats which if attractively colored will attract the attention of the fisherman. In place of a rotatable shaft, a reel can be mounted.

Thus there has been shown a novel fishing system employing a kite, and which is particularly adaptable for sports fishermen.

I claim:

1. In a fishing system, the combination of a fishing apparatus, a fishing reel assembly mounted on said apparatus, a buoy line attached at one end to said reel assembly, a buoy attached to the other end of said buoy line, means securing said fishing apparatus to said buoy line and a means for moving said fishing apparatus into a fishing area of a body of water, said means comprising a kite line connected at one end to said buoy, and a kite secured to the other end of said kite line.

2. A combination as set forth in claim 1 said fishing apparatus including a plurality of fishing lines releasably secured along said buoy line, each of said fishing lines being equidistant apart along said buoy line and each of said fishing lines including a first portion provided with a fishing hook and sinker at one end, a separate line between said sinker and a float, the first portion of said fishing line extending through a release mechanism securing said fishing line to said buoy line, the other end of said first portion of said fishing line being connected to a barrel swivel, said barrel swivel being connected by a third portion of said fishing line to said reel assembly.

3. The combination as set forth in claim 2, said reel assembly comprising a plurality of spools in adjacent alignment, said spools being supported within a trough of a cradle of a bracket, said spools each having a central opening of square configuration, a longitudinally slidable sleeve movable through said openings of said spools, the end of said sleeve having a square configurated portion for engagement selectively with one of said configurated openings of said spools, one end of said sleeve having said square configurated portion being supported upon a shaft receivable within said sleeve, said shaft being secured at its opposite end within a bearing of said bracket, the opposite end of said sleeve having a crank handle and being supported longitudinally slidable and rotatably free within a second bearing of said bracket, and each of said spools having one end of each of said fishing lines wound thereupon.

4. The combination set forth in claim 3 wherein said release mechanism comprises a ring fixably secured upon said buoy line, and a clip releasably secured to said ring, said clip comprising a pair of arms pivotally recured together at their mid-portions by a grommet, one end of each of said arms having a hook configuration for snapping over said ring, spring means carried by said arms for normally urging said hooks together and said first portion of said fishing line extending through a central opening of said grommet, whereby a pull by a fish on said first portion of said fishing line will cause said clip to disengage from said ring.

5. The combination as set forth in claim 44 wherein said buoy comprises a float, said float being hollow, a vertically upward extending mast connected to said float, a weight connected to the opposite side of said float for normally maintaining said buoy in an upright position, and said mast being telescopic.

6. The combination as set forth in claim 4 wherein said buoy comprises a vertically upward extending mast, said mast being telescopic, a plurality of radially extending arms at the lower end of said mast, and a float connected to the outer end of each of said arms.

References Cited

UNITED STATES PATENTS 3,358,399   12/1967   Waldmann _____ 43—4

FOREIGN PATENTS 1,262,033   4/1961   France.

OTHER REFERENCES

How I Got Hooked by Kite Fishing, George Daniels, Popular Science, August 1960, pp. 139, 140 and 202.

Fishing With a Kite, The Star Magazine, Washington, D.C., Apr. 1, 1962.

WARNER H. CAMP, Primary Examiner

U.S. Cl. X.R.

43—8, 27.4, 43.11